United States Patent [19]

Oshikawa et al.

[11] Patent Number: 5,011,582

[45] Date of Patent: Apr. 30, 1991

[54] METHOD FOR PRODUCING ELECTROCHROMIC DEVICE WITH APPLICATION OF AC VOLTAGE BETWEEN THE ELECTRODE LAYERS

[75] Inventors: Satoru Oshikawa, Yokohama; Tatsuo Niwa, Sakura, both of Japan

[73] Assignee: Nikon Corporation, Tokyo, Japan

[21] Appl. No.: 522,451

[22] Filed: May 14, 1990

Related U.S. Application Data

[63] Continuation of Ser. No. 288,950, Dec. 23, 1988, abandoned.

[30] Foreign Application Priority Data

Jan. 5, 1988 [JP] Japan ................................. 63-454
Sep. 14, 1988 [JP] Japan ............................. 63-230694

[51] Int. Cl.⁵ ............................. G02F 1/23; C25B 1/00
[52] U.S. Cl. ......................................... 204/140; 313/494; 313/510; 313/513; 340/752; 350/320; 350/357
[58] Field of Search ................ 204/140; 313/385, 494, 313/500, 506, 510, 513; 340/752; 350/320, 357

[56] References Cited

U.S. PATENT DOCUMENTS

| | | | |
|---|---|---|---|
| 3,521,941 | 7/1970 | Deb et al. ............................ | 350/160 |
| 3,829,196 | 8/1974 | Deb ................................ | 350/160 R |
| 4,258,984 | 3/1981 | Beni et al. ........................... | 350/357 |
| 4,350,414 | 9/1982 | Takahashi et al. .................. | 350/357 |
| 4,652,090 | 3/1987 | Uchikawa et al. .................. | 350/357 |

FOREIGN PATENT DOCUMENTS

58-70215 4/1983 Japan .

*Primary Examiner*—John F. Niebling
*Assistant Examiner*—David G. Ryser
*Attorney, Agent, or Firm*—Shapiro and Shapiro

[57] ABSTRACT

A method for producing an electrochromic device, comprises the steps of:
(a) preparing a 5-layered laminate structure consisting of:
  A: electrode layer;
  B: reductive coloring electrochromic layer;
  C: ionic conductive layer;
  $D_0$: dispersion layer consisting of metallic iridium and a dispersion medium; and
  E: electrode layer;
  wherein at least one of the electrode layers A, E is transparent; and
(b) applying an AC voltage between the electrode layers A and E in a gas atmosphere containing oxygen or water vapor, thereby converting the metallic iridium in the layer $D_0$ into oxide or hydroxide.

17 Claims, 1 Drawing Sheet

METHOD FOR PRODUCING ELECTROCHROMIC DEVICE WITH APPLICATION OF AC VOLTAGE BETWEEN THE ELECTRODE LAYERS

This is a continuation of application Ser. No. 288,950 filed Dec. 23, 1988, now abandoned.

BACKGROUND OF THE INVENTION

1. Field of the Invention

The present invention relates to a novel method for producing a reflective electrochromic device.

1. Related Background Art

A phenomenon of reversible color generation by reversible electrolytic oxidation or reduction under application of a voltage is called electrochromism. There have been attempts, for more than 20 years, to produce electrochromic devices (ECD) having a thin film of an electrochromic (EC) material, capable of showing such phenomenon, sandwiched between a pair of electrode layers and capable of generating and erasing color through the control of a voltage applied across said electrode layer, and to utilize such electrochromic devices as a light intensity controlling element, such as a nonglare mirror, or as a 7-segment numeral display element.

For example, the U.S. Pat. Nos. 3,521,941 and 3,829,196 disclose a totally solid-state ECD composed of a laminate structure of a transparent electrode layer, a thin film of tungsten trioxide and an insulating film, for example composed of silicon dioxide, formed on a glass substrate. Under the application of a coloring voltage Vc, the ECD generates blue color in the thin film of tungsten trioxide ($WO_3$), which is reduced to colorless under the application of an erasing voltage Vb of opposite polarity.

Although the mechanism of coloring and erasing has not been fully clarified, a small amount of water present in the $WO_3$ film and the insulating film (ion conductive layer) is presumed to govern the color generation and erasure of $WO_3$. The color generating reaction is conjectured as follows:

$$H_2O \rightarrow H^+ + OH^-$$

($WO_3$ film at the cathode side)

$$\underset{colorless}{WO_3} + nH^+ + ne^- \rightarrow \underset{blue}{H_nWO_3}$$

(insulating film at the anode side)

$$2OH^- \rightarrow H_2O + \tfrac{1}{2}O_2 \uparrow + e^-$$

As will be understood from the foregoing reaction formulas, $WO_3$ is a reductive coloring EC material which is colored by reduction. Also $MoO_3$ shows a similar behavior.

However, the reduction is always accompanied by an oxidation reaction. In the above-explained case, an oxidation reaction:

$$2OH^- \rightarrow H_2O + \tfrac{1}{2}O_2 \uparrow + e^-$$

takes place in the system of ECD. In this manner such ECD has been associated with the drawbacks of consumption of the contained water, in the coloring reaction, by an undesirable side reaction giving rise to the generation of oxygen gas, and indispensable water replenishment from the air for repeating the coloring process, as the water is not generated in the erasing reaction. In the ECD of this type, particularly due to the latter reason, the reproducibility of coloring process is easily affected by the water in the air.

On the other hand, U.S. Pat. No. 4,350,414 discloses a totally solid-state ECD which is capable of repeating the coloring and erasure without the water replenishment from the outside and in which the color density in repeating coloring operations is not affected by peripheral conditions, since the water is generated in the erasing reaction in an amount the same as that consumed in the coloring reaction.

The ECD is typically composed of the following:

A: electrode layer
B: reductive coloring EC layer such as $WO_3$ or $MoO_3$;
C: ionic conductive layer such as $SiO_2$ or $Ta_2O_3$;
D: oxidative coloring EC layer such as $Cr_2O_3$, $IrO_x$ or $Ir(OH)_y$; and
E: electrode layer.

At least one of the electrode layers A, E naturally has to be transparent. Either may be utilized as a reflective layer.

The ECD disclosed in the aforementioned U.S. Pat. No. 4,350,414, utilizes iridium hydroxide $Ir(OH)y$. As in ordinary hydroxides, iridium hydroxide can be regarded as a hydrate of iridium oxide $IrO_x$. In the present text, therefore, an expression "oxide of iridium", "iridium oxide", or "$IrO_x$" should be understood to include hydroxide or a mixture with hydroxide. These materials are the best oxidative coloring EC materials in ECD's ever reported.

An iridium hydroxide film, functioning as the oxidative coloring EC layer, can be prepared either by a method described in said U.S. Pat. No. 4,350,414, in which a metallic iridium film is at first formed by a thin film deposition method under vacuum such as vacuum evaporation, sputtering or ion plating, and is subsequently converted into an iridium oxide film by anodic oxidation in an electrolyte solution such as sulfuric acid; or a method described in U.S. Pat. No. 4,258,984, in which an iridium oxide film is directly formed in one step by reactive sputtering utilizing a metallic iridium target in an oxygen atmosphere; or a method described in Japanese Laid-open Patent Application 58-70215 in which the following 5-layered structure (ECD precursor) is prepared:

A: electrode layer;
B: reductive coloring EC layer;
C: transparent ionic conductive layer;
$D_0$: metallic iridium thin film; and
E: electrode layer and an AC current is applied across the electrodes A, E in a subsequent step in a gas atmosphere containing water vapor, thereby converting the $D_0$ layer (metallic iridium) into iridium oxide or iridium hydroxide.

However, in any of these methods, the D layer is composed solely of iridium oxide or hydroxide, and the ECD of U.S. Pat. No. 4,350,414 utilizing such D layer has been associated with poor resistance to high temperature.

In order to resolve this drawback, U.S. Pat. No. 4,652,090 proposes an ECD which has a 5-layered structure as proposed in U.S. Pat. No. 4,350,414 but in which the oxidative coloring EC layer is not composed of pure iridium oxide or hydroxide, but is composed of a dispersion thereof with a dispersing medium such as $SnO_2$.

Such a dispersion layer can be prepared by one of the following three methods, namely (1) a method in which a dispersion layer composed of metallic iridium and a dispersing medium is at first prepared, and is then converted into a dispersion layer composed of iridium oxide or hydroxide and dispersing medium by oxidation of metallic iridium by (i) thermal oxidation or (ii) anodic oxidation; (2) a method of directly obtaining the dispersion layer in a step by non-reactive thin film deposition under vacuum, utilizing iridium oxide and dispersing medium as evaporation sources or targets; and (3) a method of directly obtaining the dispersion layer in one step by reactive thin film deposition under vacuum utilizing iridium oxide and dispersing medium as evaporation sources or targets.

In any case, iridium oxide or hydroxide exists in particles of molecular level or in superfine particles in the dispersion.

However the method (1)(i) utilizing thermal oxidation can never achieve complete oxidation of metallic iridium, so that the obtained dispersion layer is not completely transparent and is gray colored.

The method (1)(ii) employing anodic oxidation significantly degrades the production efficiency of ECD, and elevates the cost, due to the presence of a wet anodic oxidation step in contrast to other methods consisting solely of dry steps.

The method (2) utilizing iridium oxide as the evaporation source or the target is associated with the drawbacks of difficulty in the preparation of the evaporation source or the target, and of formation of coarse particles in the dispersion layer, due to sudden boiling in the course of manufacture.

The method (3) employing reactive deposition is associated with the drawbacks of a limited dynamic range of coloring and erasure in the obtained ECD and of poor reproducibility in performance among different production lots.

SUMMARY OF THE INVENTION

An object of the present invention is to provide a novel method for producing ECD, not associated with the above-mentioned drawbacks of the prior technology.

Another object of the present invention is to provide a method for producing ECD which has a high transparency in the erased state and has a large color change range between the erased state and the colored state.

Still another object of the present invention is to provide a method for producing ECD, not including a wet step nor sudden boiling during manufacture.

The present inventors have found that, by forming a 5-layered laminate structure in which the layer D is replaced by "a dispersion layer $D_0$ composed of metallic iridium (disperse phase) and a dispersion medium" and applying an AC voltage across the electrode layers A, E of the laminate structure in a gas atmosphere containing oxygen gas or water vapor thereby converting the metallic iridium in the layer $D_0$ into iridium oxide or hydroxide and thus obtaining a 5-layered ECD consisting of:

A: electrode layer;
B: reductive coloring EC layer;
C: ionic conductive layer;
D: dispersion layer consisting of iridium oxide or hydroxide (disperse phase) and a dispersion medium; and
E: electrode layer, the ECD is not associated with the above-mentioned drawbacks though it is the same in composition and structure as that disclosed in U.S. Pat. No. 4,652,090.

In the present invention, substrates may be provided outside the electrode layers if necessary. Such substrates are to be composed of a transparent and strong material such as glass, ceramics or plastics, but, in case of a reflective ECD, the substrate opposite to the side of observation need not be transparent.

The electrode layers A, E can be composed for example of tin oxide ($SnO_2$), indium tin oxide (ITO: indium oxide containing $SnO_2$ in an amount of about 5%; having good transparency), indium oxide ($In_2O_3$), copper iodide, chromium, tin, zinc, nickel, gold, platinum, palladium, rhodium, aluminum, silver or conductive resin, but at least one of the electrodes, positioned at the side of observation, has to be transparent. The thickness of the electrode layer can be in a range of 0.01 to 0.5 $\mu m$, but it may be made thicker if desired. The electrode layer, opposite to the side of observation, may serve also as the reflective layer.

The reductive coloring EC layer B can be composed for example of tungsten trioxide or molybdenum trioxide, preferably the former.

The ionic conductive layer C can be composed of:

(1) liquid electrolyte: for example an acid such as sulfuric acid or hydrochloric acid, or aqueous solution thereof; aqueous solution of an alkali such as potassium hydroxide; or aqueous solution of a strong solid electrolyte such as sodium chloride, lithium chloride, potassium chloride or lithium sulfate:

(2) semi-solid gel electrolyte: for example aqueous solution of an electrolyte turned into gel state with a gelling agent such as polyvinyl alcohol, carboxymethyl cellulose, agar or gelatin:

(3) solid electrolyte: for example HVP, $\beta$-$Al_2O_3$, $Na_3Zr_2Si_2PO_{12}$, $Na_{1+x}Zr_2Si_xP_{3-x}O_{12}$ or $Na_5YSi_4O_{12}$ or $RbAg_4I_5$:

(4) solid synthetic resin containing water or ions: for example a water-containing vinylic polymer or a water-containing polyester such as a copolymer of $\beta$-hydroxyethyl methacrylate and 2-acrylamide-2-methylpropane sulfonic acid, or water-containing methyl methacrylate copolymer: or (5) others: tantalum oxide ($Ta_2O_5$), niobium oxide ($Nb_2O_5$), zirconium oxide ($ZrO_2$), titanium oxide ($TiO_2$), hafnium oxide ($HfO_2$), yttrium oxide ($Y_2O_5$), lanthanum oxide ($La_2O_3$), silicon oxide ($SiO_2$), magnesium fluoride, zirconium phosphate or mixtures thereof, which are insulating to electrons but are conductive to protons ($H^+$) and hydroxyl ions ($OH^-$).

The layer C, if liquid or semi-solid gel, is sandwiched between the layers B and $D_0$, but, if solid synthetic resin containing water or ions, it may serve as the adhesive material for the layers B and $D_0$, as disclosed in Japanese Laid-open Patent Application 58-1130. In such case the thickness of the layer C can be in a range of 0.1 to 1000 $\mu m$.

The use of so-called solid insulator described in (5) is preferable for the purpose of making the layer C thinner or avoiding liquid leak, and, in such case, the thickness of the layer can be in a range of 0.001 to 10 $\mu m$.

If a transmission-type ECD is desired, the layer C has to be as transparent as possible.

The layer $D_0$ contains metallic iridium or lower oxide thereof. This layer may be composed of a dispersion of metallic iridium or a lower oxide thereof dispersed in a dispersion medium. The dispersion medium can be (1) a transparent conductive inorganic oxide such as $SnO_2$, $In_2O_3$, ITO, or ZnO, or a transparent inorganic oxide such as $Ta_2O_5$, $TiO_2$, $SiO_2$, $WO_3$, $MoO_3$, or $Sb_2O_3$; or (2) a transparent inorganic fluoride such as $MgF_2$ or $CaF_2$. Among these substances particularly preferred are $SnO_2$, $In_2O_3$, ITO, ZnO and $Ta_2O_5$.

Metallic iridium, constituting the disperse phase, is preferably present in an amount of 15-25 wt. % in the dispersion layer $D_0$.

Also the disperse phase and the dispersion medium may be in an inverse relation, and the dispersion layer $D_0$ may be regarded as a mixture. What is important is that the metallic iridium, constituting the disperse phase, is dispersed in the atomic level or in the superfine particle state.

Such dispersion layer $D_0$ can be prepared by thin film deposition under vacuum.

Like the layer B, the layer $D_0$ can have a thickness of 0.001 to several microns.

The layers A to E can be prepared by thin film deposition under vacuum, such as vacuum evaporation or sputtering, except when the layer C is liquid, semisolid gel or is composed of synthetic resin.

If a patternwise display is desired, it is possible to form a desired pattern in any of the layers except the layer C, or to provide a patterned light shielding layer or an electron/ion insulating layer on any layer or between any layers.

The 5-layered precursor laminate structure can be prepared, according to the selection of the layer C, either by laminating the layers A-E in succession, or by sandwiching the layer C between a laminate structure of layers A and B, and a laminate structure of layers $D_0$ E, both prepared in advance.

According to the present invention, the precursor laminate structure is placed in a gas atmosphere containing oxygen gas or water vapor, for example in the air, and an AC voltage is applied across the electrodes A and E. The AC current can have a frequency in a range of 0.01 to 10 Hz, a voltage in a range of 0.5 to 3 volts, and can be a triangular wave, a rectangular wave, a sawtooth wave or a sinusoidal wave.

Under the application of the AC voltage, the metallic iridium in the layer $D_0$ reacts with oxygen or water in the air or from another layer, and is converted into oxide or hydroxide, thus gradually losing metallic color and becoming transparent, eventually coming to show electrochromism.

In this manner there is obtained an ECD with an elevated contrast.

In the further course of investigation, the present inventors have found that, in the preparation of a reflective ECD utilizing a transparent electrode layer for one of the electrode layers A, E and a reflective metallic electrode layer for the other, the production time can be reduced and the unevenness in colored state can be suppressed by starting from a 5-layered structure in which the order of lamination is so modified that the layer $D_0$ containing metallic iridium or lower oxide thereof is in contact with the reflective metallic electrode layer.

Therefore, the present invention is to provide a method for producing a reflective electrochromic device featured by preparing a 5-layered laminate structure consisting, in succession from the above, of:

A: reflective metallic electrode layer;
$D_0$: layer containing metallic iridium or lower oxide thereof;
C: ionic conductive layer
B: reductive coloring electrochromic layer;
E: transparent electrode layer; and
S: transparent substrate, and applying an AC voltage between the electrode layers A and E in a gas atmosphere containing oxygen or water vapor thereby converting the iridium or lower oxide thereof in the layer $D_0$ into oxide or higher oxide.

The reason for easier oxidation of iridium, when starting from the 5-layered structure in which the layer $D_0$ containing metallic iridium or lower oxide thereof is positioned next to the reflective metallic electrode layer A, is presumed as follows:

1st reason: In case the layer $D_0$ is positioned adjacent to a transparent electrode E which is of a relative high electric resistance, the AC voltage applied thereto through external wiring generates a voltage gradient within the transparent electrode layer E. Thus, in a portion of the transparent electrode layer E close to wiring, a sufficient amount of positive charge is supplied to accelerate the oxidation of the layer $D_0$, whereby the metallic iridium or lower oxide thereof is converted to oxide (for hydroxide as explained before) or higher oxide (or hydroxide as explained before) showing electrochromism.

The layer $D_0$ is originally considerably opaque and has grayish metallic reflection, but, when converted to oxide or higher oxide, becomes colorless and transparent, and increases the thickness to about 5 times.

Under further supply of positive charges, iridium reaches a still higher oxidized state, and the layer becomes transparent gray state without reflection. Thus, in response to the application of an AC voltage, the layer repeats the change between a colorless and transparent state, and a transparent gray state, thus showing electrochromism.

On the other hand, in a part distant from the external wiring, the oxidation of the layer $D_0$ is slower because of lack of a sufficient supply of charges.

Consequently there is required a long time before the entire layer $D_0$ is converted to oxide or higher oxide, and there may locally remain unoxidized areas which give rise to uneven coloring.

It is also difficult to realize uniform resistance in the entire transparent electrode layer E, and this fact will also increase the unevenness in the coloring.

2nd reason: Oxygen or water vapor used in the oxidation of the layer $D_0$ is estimated to be supplied from the outside through the metallic electrode layer A, as it cannot be supplied from the side of the substrate S. Therefore, if the layer $D_0$ is in a laminate structure A/B/C/$D_0$/E/S, oxygen or water vapor has to come through three layers A/B/C, and the resulting insufficient supply of oxygen or water vapor retards the oxidation of the layer $D_0$.

On the other hand, if the layer $D_0$ is present in a laminate structure A/$D_0$/C/B/E/S according to the present invention, oxygen or water vapor from the outside only needs to pass through the layer A, thus promoting the oxidation.

3rd reason: When oxidized, the layer $D_0$ swells in thickness to about 5 times. When the layer $D_0$ is in a laminate structure A/B/C/$D_0$/E/S, the oxidation is retarded because the layer $D_0$ cannot expand freely due to three layers A/B/C present thereon.

On the other hand, if the layer $D_0$ is present in a laminate structure $A/D_0/C/B/E/S$ according to the present invention, the expansion is easier because the layer $D_0$ supports only one layer A thereon, and the oxidation is therefore facilitated.

The transparent substrate S supporting the transparent electrode layer E is composed of a strong transparent material, such as glass, ceramics or plastics.

The transparent electrode layer E can be composed, for example, of tin oxide ($SnO_2$), ITO (indium oxide containing $SnO_2$ in an amount of about 5%; good transparency), indium oxide ($In_2O_3$), copper iodide or zinc oxide.

The metallic electrode layer A can be composed, for example, of chromium, tin, zinc, nickel, gold, platinum, palladium, rhodium, aluminum or silver.

The thickness of the electrode layer A or E can be in a range of 0.01–0.5 $\mu m$, but a larger thickness may be employed if desirable.

The composition and thickness of the layers B, C and the driving method for causing electrochromism are substantially the same as in the foregoing first embodiment.

The layer $D_0$ contains metallic iridium or lower oxide thereof. Said layer may be a dispersion layer, in which metallic iridium or lower oxide thereof constitutes the disperse phase, dispersed in a dispersion medium. In such case, the dispersion medium is composed for example of an inorganic oxide or an inorganic fluoride.

The method of the present invention allows simplifying the production facility and steps, thereby significantly reducing the production cost, in comparison with the method utilizing electrolytic oxidation in acid or alkali solution.

The ECD produced by the method of the present invention can repeat coloring and erasing with a low voltage, and can be utilized in the alphanumeric display means for calculators and watches, alarm/display means in the finder of cameras or measuring instruments, display means in the instrument panel of cars, advertising displays, spectacles with variable transmittance, mirrors with variable reflectance, windows with variable transmittance etc.

DESCRIPTION OF THE PREFERRED EMBODIMENTS

Example 1

(1) There was prepared a glass substrate S of 8 cm (length)×15 cm (width)×2 mm (thickness) on which an ITO transparent electrode layer E of a thickness of 0.15 $\mu m$ was prepared.

(2) The substrate was loaded in an electron beam-heated vacuum evaporation apparatus equipped with metallic iridium and tin oxide as two evaporation sources, and vacuum evaporation (non-reactive) was conducted under vacuum of $1-5\times10^{-5}$ Torr and an evaporation speed of 10 Å/sec to form a dispersion layer $D_0$ of a thickness of 700 Å on the layer E.

Analysis of dispersion layer $D_0$ revealed that it contained metallic iridium in an amount of 20 wt. % with respect to the entire dispersion layer.

(3) Subsequently vacuum evaporation was conducted under vacuum of $1-2\times10^{-4}$ Torr and with an evaporation speed of $2-3\times10^{-4}$ $\mu m$/sec to form, on the layer $D_0$, a transparent ionic conductive layer C of a thickness of 0.25 $\mu m$, composed of tantalum pentoxide.

(4) Then vacuum evaporation was conducted under vacuum of $1-2\times10^{-4}$ Torr and with an evaporation speed of $5-10\times10^{-4}$ $\mu m$/sec to form, on the layer C, a reductive coloring EC layer B of a thickness of 0.25 $\mu m$, composed of tungsten trioxide.

(5) Finally, a reflective aluminum electrode layer A of a thickness of 1000 Å was formed, on the layer B, by vacuum evaporation under the conditions:
source: aluminum
vacuum: $5\times10^{-6}$ Torr
substrate temp.: room temp.

Figure 1:
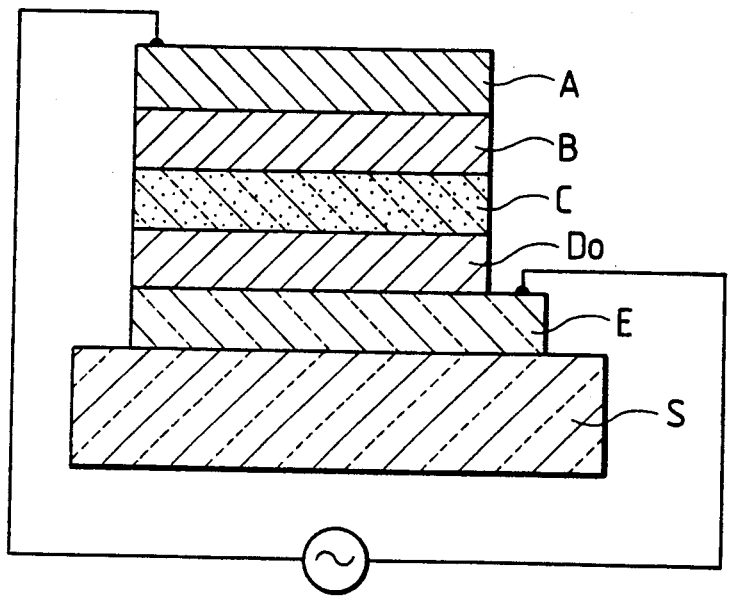
FIG. 1 is a schematic cross-sectional view of a starting laminate structure (precursor) in a first example of the present invention.
Figure 2:
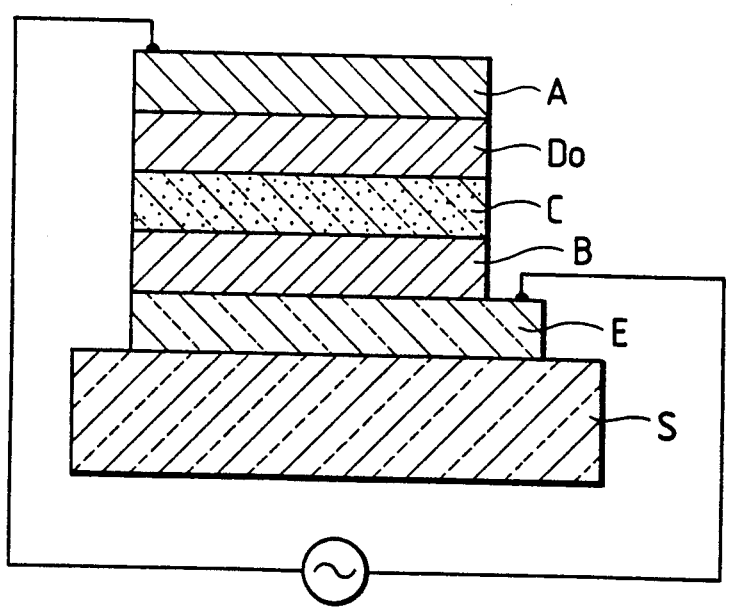
FIG. 2 is a schematic cross-sectional view of a starting laminate structure (precursor) in a second example of an present invention.

(6) An AC voltage of ±1.35 V, 0.05 Hz was applied between the electrode layers A and E of the 5-layered laminate structure (see FIG. 1) thus obtained, for 10 hours, to convert the metallic iridium in the layer $D_0$ into iridium oxide or hydroxide, thereby producing a reflective ECD of 5-layered structure.

Example 2

(1) As in the example 1, there was prepared a glass substrate S of 8 cm (length)×15 cm (width)×2 mm (thickness) provided with an ITO transparent electrode layer E of a thickness of 0.15 $\mu m$.

(2) The substrate was loaded in an electron beam-heated vacuum evaporation apparatus equipped with $WO_3$ as the evaporation source, and vacuum evaporation was conducted under vacuum of $1-2\times10^{-4}$ Torr and with an evaporation speed of $5-10\times10^{-4}$ $\mu m$/sec to form a reductive coloring EC layer B of a thickness of 0.25 $\mu m$ composed of tungsten trioxide.

(3) Subsequently vacuum evaporation was conducted, on layer B, under vacuum of $1-2\times10^{-4}$ Torr and with an evaporation speed of $2-3\times10^{-4}$ $\mu m$/sec to form a transparent ionic conductive layer C of a thickness of 0.25 $\mu m$, composed of tantalum pentoxide.

(4) With metallic iridium and tin oxide as two evaporation sources in the same electron beam heated vacuum evaporation apparatus, vacuum evaporation (non-reactive) was conducted under vacuum of $1-5\times10^{-5}$ Torr and with an evaporation speed of 10 Å/sec to form a dispersion layer $D_0$ of a thickness of 700 Å on the layer E.

Analysis of dispersion layer $D_0$ revealed that it contained metallic iridium in an amount of 20 wt. % with respect to the entire dispersion layer.

(5) Finally a reflective aluminum electrode layer of a thickness of 1000 Å was formed on the layer $D_0$, by vacuum evaporation under the conditions:
source: aluminum
vacuum: $5\times10^{-6}$ Torr
substrate temp.: room temp.

(6) An AC voltage of ±1.35 V, 0.05 Hz was applied, through external wiring, between the electrode layers A and E of the 5-layered laminate structure thus obtained (see FIG. 1), for a period of 1-2 hours, thereby converting metallic iridium in the layer $D_0$ into oxide thereof. In this manner a reflective ECD of 5-layered structure was produced. The period of voltage application is extremely short, in comparison with 10 hours required in the example 1 for oxidation of the layer $D_0$.

Reference Example

An ECD was produced in the same manner as in the example 1, except that the dispersion layer D was directly prepared, as explained below, instead of the formation of the layer $D_0$ and that the application of the AC voltage was not employed in the final step.

Preparation of layer D

A transparent dispersion layer D of a thickness of 700 Å, composed of iridium oxide as the disperse phase and tin oxide as the dispersion medium, was formed by high-frequency ion plating (reactive) under the conditions:

evaporation source: $SnO_2$ and metallic iridium;
vacuum: $5 \times 10^{-6}$ Torr
$O_2$ partial pressure: $3 \times 10^{-4}$ Torr
substrate temp.: 20° C.

The content of iridium (converted as metal) in the dispersion layer D was 20 wt. %.

Example of test

The ECD's prepared in the examples 1 and 2, and in the reference example were sealed by respectively adhering thereto a sealing glass substrate with an epoxy resin (sealing and adhesive), and were then subjected the following test.

Coloring/erasing test

When a coloring voltage of +1.35 V was applied between the electrode layers A and E, the ECD's of the examples 1 and 2 showed a rapid decrease in reflectance, and reached a saturated level in about 10 seconds. This state was retained even after the voltage application was terminated. However unevenness in coloring was observed in the ECD of the example 1.

Then, when an erasing voltage was continuously applied, the reflectance rapidly recovered in all the cases, and reached a saturated state in about 10 seconds. However unevenness in color was observed in the ECD of the example 1.

The reflectance was measured at the center of the ECD, with monochromatic light of wave length $\lambda = 600$ nm.

For each ECD, the reflectance Rc was measured after the application of the coloring voltage +1.35 V for 10 seconds, and the reflectance Rb was measured similarly after the application of the erasing voltage −1.35 V for 10 seconds. The results are summarized in Tab. 1.

TABLE 1

| ECD Coloring/erasing test | (Test results) | | |
|---|---|---|---|
| | Example 1 | Example 2 | Ref. Ex. |
| Rc/Rb | 9%/60% | 10%/75% | 14%/50% |

Continuous drive test

The ECD's of the example 1 and the reference example were subjected to the application, between the electrode layers A and E, of $10^5$ cycles of a rectangular wave in which a cycle consists of +1.35 V for 10 seconds and −1.35 V for 10 seconds. The reflectance was measured as explained before, and the results are shown in Tab. 2.

TABLE 2

| ECD Cont. Drive test | (Test results) | |
|---|---|---|
| | Example 1 | Ref. Ex. |
| Rc/Rb | 8%/60% | 13%/51% |

What is claimed is:

1. A method for producing an electrochromic device, comprising the steps of:
   (a) preparing a 5-layered laminate structure consisting of:
   A: electrode layer;
   B: reductive coloring electrochromic layer;
   C: ionic conductive layer;
   $D_0$: dispersion layer consisting of metallic iridium or lower oxide thereof and a dispersion medium; and
   E: electrode layer;
   wherein at least one of the electrode layers A and E is transparent; and thereafter
   (b) applying an AC voltage between the electrode layers A and E in a gas atmosphere containing oxygen or water vapor, thereby converting the metallic iridium or lower oxide thereof in the layer $D_0$ into oxide or higher oxide thereof.

2. A method according to claim 1, wherein said dispersion medium is composed of an inorganic oxide.

3. A method according to claim 2, wherein said inorganic oxide contains at least a member selected from a group consisting of $SnO_2$, $In_2O_3$, ITO and ZnO.

4. A method according to claim 1, wherein said dispersion medium is composed of an inorganic fluoride.

5. A method according to claim 1, wherein said metallic iridium is contained in said dispersion layer, in an amount of 15 to 25% by weight.

6. A method according to claim 1, wherein said laminate structure is provided on a substrate, and at least one of said substrate, electrode layer A and electrode layer E has a reflective characteristic.

7. A method according to claim 6, wherein said electrode layer A is composed of a reflective metal.

8. A method for producing an electrochromic device, comprising the steps of:
   (a) preparing a 5-layered laminate structure consisting of, in succession from the top:
   A: electrode layer;
   $D_0$: layer containing metallic iridium or lower oxide thereof;
   C: ionic conductive layer;
   B: reductive coloring electrochromic layer;
   E: electrode layer; and
   S: substrate;
   wherein at least one of the electrode layers A and E is transparent; and thereafter
   (b) applying an AC voltage between the electrode layers A and E in a gas atmosphere containing oxygen or water vapor, thereby converting the metallic iridium or lower oxide thereof in the layer $D_0$ into oxide or higher oxide thereof.

9. A method according to claim 8, wherein said layer $D_0$ further contains a dispersion medium.

10. A method for producing a reflective electrochromic device, comprising the steps of:

(a) preparing a 5-layered laminate structure consisting of, in succession from the top:
   A: reflective electrode layer;
   $D_0$: layer containing metallic iridium or lower oxide thereof;
   C: ionic conductive layer;
   B: reductive coloring electrochromic layer;
   E: transparent electrode layer; and
   S: substrate;
   and thereafter
(b) applying an AC voltage between the electrode layers A and E in a gas atmosphere containing oxygen or water vapor, thereby converting the metallic iridium or lower oxide thereof in the layer $D_0$ into oxide or higher oxide thereof.

11. A method according to claim 10, wherein said layer $D_0$ further contains a dispersion medium.

12. A method for producing a reflective electrochromic device, comprising the steps of:
(a) preparing a 5-layered laminate structure consisting of, in succession from the top:
   A: reflective metallic electrode layer;
   $D_0$: layer containing metallic iridium or lower oxide thereof;
   C: ionic conductive layer;
   B: reductive coloring electrochromic layer;
   E: transparent electrode layer; and
   S transparent substrate; and thereafter
(b) applying an AC voltage between the electrode layers A and E in a gas atmosphere containing oxygen or water vapor, thereby converting the metallic iridium or lower oxide thereof in the layer $D_0$ into oxide or higher oxide thereof.

13. A method according to claim 12, wherein said layer containing metallic iridium or lower oxide thereof is composed of a dispersion layer consisting of metallic iridium and a dispersion medium.

14. A method according to claim 13, wherein said dispersion medium is composed of inorganic oxide.

15. A method according to claim 14, wherein said inorganic oxide contains at least a member selected from a group consisting of $SnO_2$, $In_2O_3$, ITO and ZnO.

16. A method according to claim 12, wherein said dispersion medium is composed of inorganic fluoride.

17. A method according to claim 12, wherein said metallic iridium is contained in said dispersion layer, in an amount of 15 to 25% by weight.

* * * * *